United States Patent [19]
Li

[11] Patent Number: 5,494,866
[45] Date of Patent: * Feb. 27, 1996

[54] STRESS-RUPTURE RESISTANT SINTERED SILICON NITRIDE

[75] Inventor: Chien-Wei Li, Livingston, N.J.

[73] Assignee: AlliedSignal Inc., Morristown, N.J.

[ * ] Notice: The portion of the term of this patent subsequent to May 17, 2011, has been disclaimed.

[21] Appl. No.: 257,598

[22] Filed: Jun. 9, 1994

Related U.S. Application Data

[63] Continuation-in-part of Ser. No. 96,203, Jul. 23, 1993, which is a continuation of Ser. No. 865,581, Apr. 9, 1992, abandoned, which is a continuation-in-part of Ser. No. 716,142, Jun. 17, 1991, abandoned.

[51] Int. Cl.⁶ .................................................. C04B 35/584
[52] U.S. Cl. .................... 501/97; 501/92; 501/98
[58] Field of Search ................................. 501/92, 97, 98

[56] References Cited

U.S. PATENT DOCUMENTS

| | | |
|---|---|---|
| 3,890,250 | 6/1975 | Richerson ............................. 501/97 X |
| 4,184,882 | 1/1980 | Lange ..................................... 501/92 |
| 4,234,343 | 11/1980 | Andersson ............................. 501/98 |
| 4,628,039 | 12/1986 | Mizutani et al. ..................... 501/98 X |
| 4,795,724 | 1/1989 | Soma et al. ............................ 501/98 |
| 4,870,036 | 9/1989 | Yeh ..................................... 501/98 X |
| 4,904,624 | 2/1990 | Yeckley ............................... 501/98 X |
| 5,177,038 | 1/1993 | Takahashi et al. ..................... 501/92 |
| 5,229,046 | 7/1993 | Watanabe et al. .................... 501/92 X |
| 5,312,788 | 5/1994 | Li et al. ............................... 501/92 X |

*Primary Examiner*—Karl Group
*Attorney, Agent, or Firm*—Ernest D. Buff; Roger H. Criss

[57] ABSTRACT

A silicon nitride sintered body has a composition consisting essentially of from 75 to 96 wt % of silicon nitride; yttrium oxide present in an amount ranging from about 2 to 10 wt %; at least one oxide of the Lanthanide (Ln) element, wherein the molar ratio of Ln to Y is smaller than 1; strontium oxide present in an amount wherein the molar ratio of Sr to the sum of Y and Ln is between 0.1 and 0.5; and 0.2 to 5 wt % of silicon carbide. Such a ceramic has high strength, high toughness and long term durability, and is especially suited for industrial applications such as components for gas turbine and automotive engines.

10 Claims, 2 Drawing Sheets

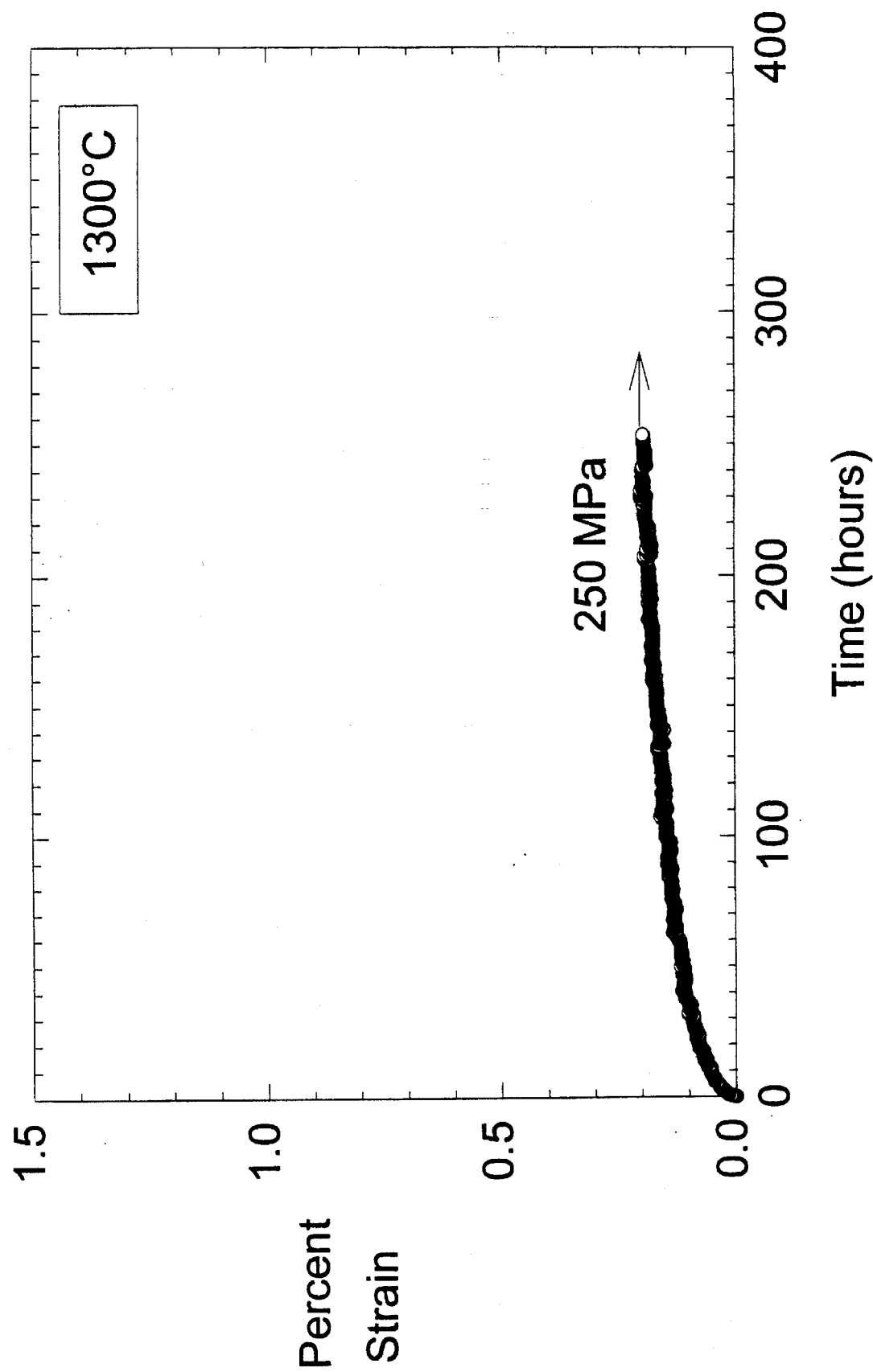

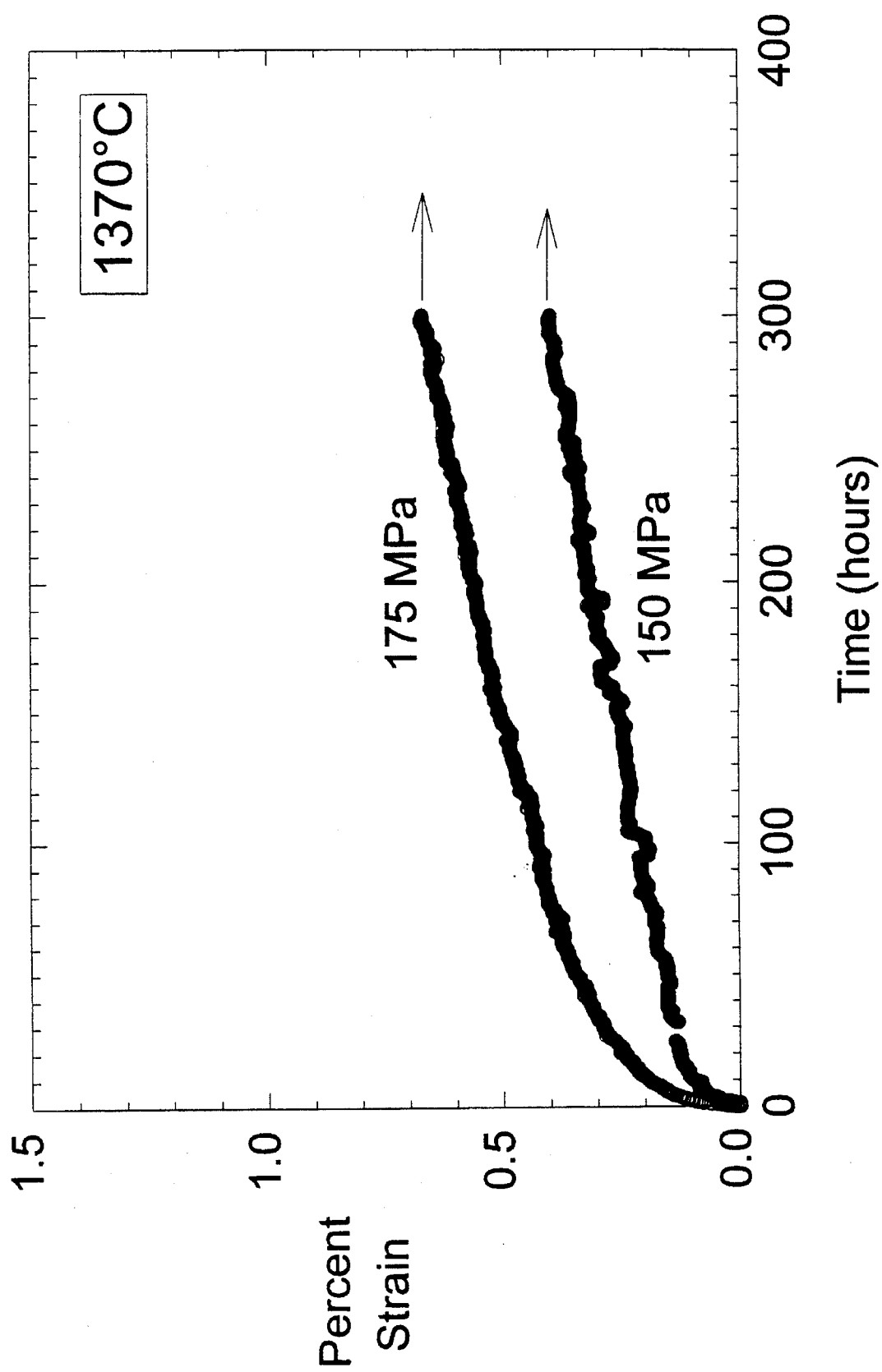

STRESS-RUPTURE RESISTANT SINTERED SILICON NITRIDE

CROSS-REFERENCE TO RELATED APPLICATIONS

This is a continuation-in-part of U.S. patent application Ser. No. 08/096,203, pending, filed Jul. 23, 1993, entitled "Sintered Silicon Nitride of High Toughness, Strength and Reliability", which is a File-Wrapper Continuation of Ser. No. 07/865,581, filed Apr. 9, 1992, now abandoned, which is a continuation-in-part of U.S. application Ser. No. 07/716,142, filed Jun. 17, 1991, now abandoned, entitled "High Toughness-High Strength Sintered Silicon Nitride".

BACKGROUND OF THE INVENTION

1. Field of the Invention

This invention relates to a sintered silicon nitride having excellent stress rupture and oxidation resistance, as well as to a method of manufacturing the same.

2. Description of the Prior Art

Silicon nitride ceramics are well known for their excellent strength at temperature in excess of 1000° C. However, at temperature greater than 1200° C. for the advanced turbine engine applications, few silicon nitride ceramics meet the strength and reliability requirements. Furthermore, conventional silicon nitride ceramics have fracture toughness typically ranging from 4 to 6 $MPa \cdot m^{0.5}$, such low toughness makes them susceptible to significant strength degradation from the damage introduced during engine operation. It would be desirable to provide a silicon nitride having high fracture toughness, hence strong resistance to damage, high strength, and high reliability both at room and elevated temperature. Moreover, it would be most desirable to have a silicon nitride material with this combination of excellent properties which can easily be formed into near net shape parts of complex geometry.

Hot pressing generally produces silicon nitride ceramics with excellent strength properties. U.S. Pat. No. 4,234,343 to Anderson discloses that hot pressed silicon nitride containing different rare earth oxides as sintering aids can have 250 MPa to 550 MPa strength at 1400° C. with smaller rare earth (Re) element resulting in higher 1400° C. strength. Ueno and Toibana report in Yogyo-Kyokai-Shi, vol. 9, 409–414 (1983) that hot pressed silicon nitride containing yttria ($Y_2O_3$) in combination with other rare earth oxides exhibits strength of over 600 MPa at 1300° C. U.S. Pat. No. 5,021,372 discloses silicon nitride based ceramic formed by hot pressing having room temperature 4-point bend strength ranging from about 600 to 1200 MPa and fracture toughness greater than 6 $MPa \cdot m^{0.5}$, but the additives used in the fabrication restrict the applications of this silicon nitride to relatively low temperature. Furthermore, it is well known in the field that the process of hot pressing has limited value in the production of structural ceramics because of its shape and size limitations. It is also well known that hot pressing results in a product with anisotropic microstructure and mechanical property undesirable for most applications.

Hot isostatic pressing has the same advantages as hot pressing but without the shape, size, and anisotropy limitations. U.S. Pat. No. 4,904,624 to Yeckley teaches the fabrication of silicon nitride parts containing rare earth sintering aid with flexural strength in excess of 525 MPa at 1370° C. using glass-encapsulated hot isostatic pressing. However, the fracture toughness of this $Si_3N_4$ is only 4 to 5 $MPa \cdot m^{0.5}$. Similarly, U.S. Pat. No. 4,870,036 to Yeh teaches how to fabricate silicon nitride ceramics containing yttria and strontium compound having flexural strength greater than 465 MPa at 1375° C. using hot isostatic pressing, but the fracture toughness of this $Si_3N_4$ is 5 to 6 $MPa \cdot m^{0.5}$. Thus, although hot isostatic pressing can produce silicon nitride ceramics with excellent strength, the fracture toughness of such material is low.

Gas pressure sintering is a manufacturing process for silicon nitride employing moderate nitrogen pressure during high temperature firing. It can be used to fabricate refractory silicon nitride parts without shape and size limitations. U.S. Pat. No. 4,628,039 to Mizutani et al. describes using gas pressure sintering to fabricate silicon nitride ceramics having excellent four-point bending strength at 1300° C. Said silicon nitride ceramics contain sintering aids consisting of oxides of two rare earth elements having ionic radii greater and smaller than 0.97 Å respectively, and other minor additives such as oxides of elements from Group IIa of the Periodic Table. U.S. Pat. No. 4,795,724 to Soma et al. describes gas pressure sintered silicon nitride containing at least two kinds of sintering aids, selected from Y, Er, Tin, Yb, and Lu, and having a 1400° C. flexural strength of at least 500 MPa; an example given in this patent shows that a gas pressure sintered silicon nitride ceramic containing $Y_2O_3$ and $La_2O_3$ has a strength of only 230 MPa at 1400° C. No efforts were made in the above identified inventions to fabricate a silicon nitride of unusual microstructure, toughness, flaw tolerance, and high Weibull modulus.

It has been reported that silicon nitride containing 10 to 50% by volume silicon carbide, according to U.S. Pat. No. 3,890,250, and up to 40% by volume silicon carbide, according to U.S. Pat. No. 4,184,882, has improved strength at 1400° C.; the ceramics taught by those patentees were prepared by hot pressing and their fracture toughness was not reported. U.S. Pat. No. 4,800,182 to Izaki et al. discloses a hot pressed silicon nitride/silicon carbide composite, with 5 to 30 wt % of silicon carbide, having three-point bending strength of at least 930 MPa at room temperature and fracture toughness of 5.3 to 7 $MPa \cdot m^{0.5}$ depending on the silicon carbide content. U.S. Pat. No. 4,814,301 to Steinmann et al. discloses the fabrication of a sintered silicon nitride using crystalline silicates and metal carbides with high retained strength at 1200° C. The strength of those silicon nitride ceramics at 1375° C. will not be high since silicates containing Na, Ca, Mg, Al, and Fe, etc. are used. Furthermore, there is no disclosure in Steinmann concerning said properties as microstructural toughness and flaw tolerance, or the importance of these properties in achieving reliable ceramics. There remains a need in the art for tough, strong, and reliable silicon nitride ceramics.

Moreover, for the most demanding advanced heat engines applications such as turbine blade and nuzzle which may experience very high stress at temperatures up to ~2500° F. (1370° C.), few $Si_3N_4$ ceramics have the stress-rupture property that meets the lifetime requirement for those turbine parts which can be thousands of hours. The stress-rupture property reflects how long a material can survive a range of stresses at different temperatures simulating the operating conditions. It is determined by the material's resistance to the atmosphere attack, slow crack growth and creep damages at high temperatures.

In spite of their good high-temperature strength, most $Si_3N_4$ ceramics have poor stress-rupture resistance in the temperature range of 1200°–1400° C. mainly because of the softening of their grain boundary phases, causing excessive creep deformation of the material. It is known that $Si_3N_4$ ceramics having sintering aids consisting of oxides of Re element and Al, Mg, Ca, Hf, or Zr are particularly poor in stress-rupture property at high temperatures, wherein Re represents yttrium and Lanthanide (Ln) elements including La, Ce, Pt, Nd, Sm, Eu, Gd, Tb, Dy, Ho, Er, Tm, Yb, and Lu. For example, hot pressed (HP) $Si_3N_4$ ceramics sintered with magnesium oxide has a lifetime of only ~0.01 hour at 1300 C under a 380 MPa 4-point bend stress (J. Mater. Sic., v. 25, p. 4361–76, 1990) or under a 150 MPa tensile stress (J. Am. Ceram. Soc., v. 65, p. 15–21, 1982). Similarly, a sintered $Si_3N_4$ having 3 wt % alumina and 5 wt % yttrium oxide ($Y_2O_3$) exhibits a stress-rupture lifetime of less than 10 hours and a fast creep rate of $10^{-6}$ $s^{-1}$ under a 70 MPa tensile stress at 1350 C (J. Am. Ceram. Soc., V.76, P. 3 105–12, 1993).

$Si_3N_4$ ceramics sintered with pure Re oxide(s) may have a better stress-rupture resistance in the temperature range of 1200°–1400° C. since their grain boundary phases could be refractory. However, they may require HP or hot-isostatic-pressing (HIP) process to achieve full density because of the refractoriness of the grain boundary phases. These pressure-assisted processes are expensive, and have limitations on the size, shape and as-fired surface property of the parts.

Moreover, $Si_3N_4$ ceramics sintered with pure Re oxides suffer the intermediate temperature oxidation problem due to the oxidation of the oxynitride phases at the grain-boundaries. This oxidation problem takes place in the temperature range of ~700°–1100 ° C. and results in excessive weight gain, strength loss, and even spontaneous cracking of the materials. The oxynitride phases known to be causing the intermediate temperature oxidation problem are H phase [$Re_5(SiO_4)_3N$], K phase ($ReSiO_2N$), J phase ($Re_4Si_2O_7N_2$), and melilite phase ($Re_2O_3Si_3N_4$), etc. These phases are commonly found in sintered silicon nitride ceramics and are easily identifiable using X-ray diffraction technique.

U.S. Pat. No. 4904624 discloses a $Si_3N_4$ containing Re oxide sintering aid in an amount 1 to 5 wt % to have a stress-rupture lifetime greater than 200 hours at 1370 C under a 300 MPa 4-point bend stress. According to that patent, the purpose of adding such a low amount of sintering aid is to form the disilicate grain boundary phase ($Y_2Si_2O_7$) free of nitrogen and thus to avoid the intermediate temperature oxidation problem. However, to densify the material requires using glass encapsulated HIPing. It is also known that the disilicate phase is not very refractory, therefore the creep resistance of the material at a temperature as high as 1370° C. is not expected to be very good.

U.S. Pat. No. 5 177038 discloses a sintered $Si_3N_4$ having primarily $Yb_2O_3$, $Y_2O_3$, and silicon carbide (SIC) as sintering additives, and claims to have high strength at 1400° C. However, this type of material is expected to have poor intermediate temperature oxidation resistance because of the addition of a large quantity of Re sintering aids which form the H, J, and K phases that are known to be associated with the problem.

SUMMARY OF THE INVENTION

The present invention provides a silicon nitride ceramic that is tough, strong and has exceptionally high reliability. Such advantageous properties are the direct result of a unique microstructure and composition present in the sintered body. In particular, an object of the present invention is to provide a sintered silicon nitride ceramic having excellent high temperature stress-rupture resistance and intermediate temperature oxidation resistance, as well as a method to produce the same. Such ceramics are processed using gas pressure sintering, and therefore can be manufactured into complex shapes easily and economically.

In accordance with the present invention, there is provided a sintered $Si_3N_4$ ceramic having a composition consisting essentially of:

(a) from 75 to 96 wt % of silicon nitride;

(b) yttrium oxide present in an amount ranging from about 2 to 10 wt %;

(c) at least one oxide of the Lanthanide (Ln) element, wherein the molar ratio of Ln to Y is smaller than 1;

(d) strontium oxide present in an amount wherein the molar ratio of Sr to the sum of Y and Ln is between 0.1 and 0.5; and (e) 0.2 to 5 wt % of silicon carbide.

The invention further provides a process for making such silicon nitride. Said process comprises the steps of mixing $Si_3N_4$, $Y_2O_3$, $Ln_2O_3$, $SrCO_3$ which converts to SrO during sintering, and SiC powders, forming the mixture into a green body, and then sintering the body using a multi-step process. Said multi-step process comprises the steps of firing in the temperature range of 1500° C. to 2045° C. wherein (a) an initial sintering is carried out at temperatures between 1500° and 1850° C. for a time greater than one but less than twelve hours; (b) an intermediate sintering is carried out at temperatures between 1850° and 2000° C. for at least 30 minutes but less than five hours; (c) a final sintering is carried out at temperatures ranging from about 2000° to 2045° C. and for a time ranging from about one to five hours; (d) each of the steps being carried out under nitrogen pressure sufficiently high to avoid decomposition of silicon nitride, and the temperature of the succeeding steps being at least 25° C. greater than that of the first of the steps.

The product of this invention has excellent stress-rupture resistance at high temperatures and has an excellent intermediate temperature oxidation resistance. Specifically, under a 380 MPa (55 ksi) 4-point bend stress the product of this invention has a lifetime greater than 100 hours at 1370° C. Furthermore, under a 150 MPa tensile stress the product of this invention has a lifetime greater than 300 hours at 1370° C. with a low steady state creep rate of $2 \times 10^{-9}$ $s^{-1}$. Unexpectedly, the product of this invention also has excellent intermediate temperature oxidation resistance. The weight gain of the material after 100 hour of oxidation in air at 1000° C. is less than about 0.5 mg/cm$^2$, and can be as low as <0.1 mg/cm$^2$.

Advantageously, the silicon nitride of this invention is fabricated by a gas pressure sintering process which does not have the shape and size limitations of hot pressing, and which does not require the encapsulation and de-encapsulation steps and the high gas pressure of hot isostatic pressing. The combination of excellent properties and ease of fabrication makes the silicon nitride ceramics of the present invention most suitable for industrial applications such as components for gas turbine and automotive engines and as cutting tools.

BRIEF DESCRIPTION OF THE DRAWING

The invention will be more fully understood and further advantages will become apparent when reference is made to the following description of the preferred embodiments of the invention and the accompanying drawings, in which:

FIG. 1 is a graph illustrating the creep strain versus time at 1300° C. under a 250 MPa tensile stress for a product produced in accordance with this invention (sample No. 20); and FIG. 2 is a graph illustrating the creep strain versus time at 1370° C. for products produced in accordance with this invention, one of the products (sample No. 20) being under a 175 MPa and another of the products (sample No. 25) being under a 150 Mpa stress, respectively.

DETAILED DESCRIPTION OF THE PREFERRED EMBODIMENTS

The product of the present invention is fabricated by sintering a powder compact comprising powders of $Si_3N_4$, $Y_2O_3$, at least one $Ln_2O_3$, $SrCO_3$, or SrO, and SiC. Preferably, the $Ln_2O_3$ is one of the oxides of La, Pr, Er, and Yb. More preferably, the $Ln_2O_3$ is $La_2O_3$ or $Yb_2O_3$.

The product of this invention should comprise no less than 75 weight percent silicon nitride so that the volume fraction of the grain boundary phases is not too high as excessive grain boundary phase may degrade the fracture toughness and high temperature properties. However, the amount of silicon nitride should be no more than 96 weight percent so that the quantity of liquid phase for sintering is sufficient for densification to proceed to at least 95 percent of theoretical density.

The product of the present invention is fabricated by adding about 4 to 25 percent by weight sintering additives consisting of $Y_2O_3$ in the amount of 2 to 10 wt %, $Ln_2O_3$ in an amount wherein the Ln/Y molar ratio is smaller than 1, SrO in an amount wherein the Sr/(Y+Ln) molar ratio is between 0.1 and 0.5, and SiC in the amount 0.2 to 5 wt % of the total. One reason for selecting a composition of $Y_2O_3$, $Ln_2O_3$, and a strontium compound is to reduce the liquidus temperature of the system so that densification and microstructure development can be accomplished by processes other than hotpressing or hot isostatic pressing. If only rare earth oxides were used, the resultant sintered body would also exhibit poor intermediate temperature oxidation resistance. Increasing the silica content or adding minor amounts of oxides or nitrides of Al, Mg, Ca, Zr, etc, enhances the densification, but the resultant sintered body is poor in the high temperature stress-rupture property.

The addition of SrO in accordance with this invention promotes ease of sintering, and improves the intermediate temperature oxidation resistance of the material. The improvement in the sintering property is due to the reduction in the liquidus temperature, while the improvement in the intermediate temperature oxidation resistance is related to the modifications of the grain boundary phase properties by SrO. After sintering, SrO incorporates into the crystallized grain boundary phases and substitutes for Re and nitrogen in the oxynitride phases. This improves the oxidation resistance of the oxynitride phases because their nitrogen contents are reduced. If the molar ratio of Sr to (Y+Ln) is smaller than about 0.1, the oxynitride phases have too much nitrogen to reduce the oxidation weight gain of the sintered product to <~0.5 mg/cm$^2$ after 100 hours at 1000 C. in air. If the molar ratio is greater than about 0.5, after the grain boundary phase crystallizes too much Sr is rejected into the residual grain boundary amorphous phase. This results in a significant reduction in the refractoriness of the amorphous phase and degrades the stress-rupture resistance of the material at high temperatures.

The SiC compound addition improves the strength properties through moderation of the grain growth kinetics during sintering thus resulting in a more uniform and finer microstructure, and through the modification of grain boundary properties. During sintering, two possible reactions occur in the product of this invention owing to the addition of metal-carbon compound. First, the SiC compound can partially dissolve into liquid phase at sintering temperature, and because carbon has strong bonding with other cation elements such as silicon and rare earth in the liquid, the viscosity of the liquid can be increased. Second, excess SiC compound particles at grain boundaries can inhibit grain boundary migration. The combination of these two effects can suppress exaggerated grain growth and result in a more uniform and finer microstructure as compared to the microstructure of a similarly processed silicon nitride which does not contain SiC compound. This more uniform and finer microstructure affords production of ceramic parts having high strength. Incorporating carbon in the grain boundary glassy phase also improves its rigidity and as a result the high temperature stress rupture resistance of the sintered silicon nitride improves. Similar effects of carbon on the properties of oxycarbonitride and oxycarbide glasses have been reported by, for instance, J. Homeny et al, J. Am. Ceram Soc., 70 [5] C114 (1987).

After sintering, SiC particles are uniformly distributed in the grain boundary pockets and inside some $Si_3N_4$ grains. This positively effects the creep resistance of the material by hindering the deformation of the grain boundary phases, and increasing the resistance to dislocation movement inside the $Si_3N_4$ grains. According to this invention, SiC is added in the amount of 0.2 to 5 wt % of the total. Too much SiC can hinder the densification during sintering, as well as degrade the oxidation resistance at high temperatures. It can also adversely affect the creep resistance by creating a fine-grained microstructure. The SiC used in the fabrication can be crystalline or amorphous. Besides added as powder, it can also be introduced via a chemical reaction of a carbon bearing species in gas, liquid or solid state with silicon-containing species which eventually forms a silicon carbide of either α or β phase in the silicon nitride ceramics.

In addition, a microstructure consisting of high density of $Si_3N_4$ grains with high aspect ratio is especially resistant to grain sliding and helps improve the creep resistance. This microstructure also creates smaller grain boundary pockets in which the oxynitride phases reside. Consequently, the stresses created by the oxidation of the oxynitride phases at intermediate temperatures are lower, and the intermediate temperature oxidation resistance improves.

It has been found that for a sintered product consisting essentially of:

(a) from 85 to 96 wt % of silicon nitride;

(b) $Y_2O_3$ present in an amount ranging from about 3 to 7 wt %;

(c) $Ln_2O_3$ present in an amount wherein the molar ratio of Ln to Y is between 0.1–0.6;

(d) SrO present in an amount wherein the molar ratio of Sr to the sum of Y and Ln is 0.17–0.25; and (e) SiC present in an amount ranging from about 0.5 to 4 wt % of the total, the stress-rupture resistance at temperatures greater than 1300° C. as well as the intermediate temperature oxidation resistance are particularly strong. In addition, such a composition is readily densified to at least 98% of the theoretical density.

According to this invention, a desirable microstructure and grain boundary property yielding high toughness, high strength and high stress-rupture resistance can be generated by sintering the silicon nitride powder compact of aforedefined compositions by a special process consisting of at least two temperature steps.

The purpose for the first firing step is to prepare an intermediate ceramic of about 70 to 95 percent theoretical density comprising a high density of whisker-like $\beta Si_3N_4$ grains of uniform sizes nucleated and grown in situ through the transportation of atoms via vapor and liquid phases. The formation of this intermediate microstructure is possible since the powder compact initially had high pore volume providing room for $\beta Si_3N_4$ grain to grow along its c axis under the anisotropic surface energy driving force. This incorporation of high density of whisker in the ceramic body can not be achieved by traditional ceramic processing means without problems such as agglomeration and poor green density which translate to sintered parts of poor quality. The firing temperature should be greater than 1800° C. so that the nucleation and growth rates for the whisker-like $\beta Si_3N_4$ grain are adequate. It should be less than 2000° C. because higher temperatures during this step result in exaggerated growth of silicon nitride grains which can eventually lead to a ceramic body of undesirable microstructure. In addition, the firing time should range from about one to 10 hours to allow sufficient amount of whisker-like $\beta Si_3N_4$ grains to develop while controlling grain coarsening so that densification and development of desirable microstructure proceeds.

The intermediate ceramic is then further sintered at a temperature ranging from 2000° C. to 2100° C. for a time ranging from 1 to 10 hours in order to form a final ceramic body reaching at least 95 percent of theoretical density and to further develop the in-situ grown, whisker-like $\beta Si_3N_4$ grains. A temperature higher than 2000° C. and at least 25° C. higher than that of the first step is selected in order to complete the densification of the ceramic and to generate a large quantity of whisker-like $\beta Si_3N_4$ grains. The temperature is limited to less than 2100° C. because at temperatures in excess of 2100° C the process of grain coarsening becomes significant and has undesirable effects on microstructure. The heat treating time should range from 1 to 10 hours so that sufficient densification and grain growth occur for the desirable microstructure to form.

The sintering and heat treating steps are carried out under elevated pressure of nitrogen gas or of a mixture of $N_2$ with one or more inert gases such as Ar or He. Further, in order to prevent excessive decomposition of silicon nitride during the sintering and heat treating steps, it is preferred that the nitrogen pressure is not less than 3.3, 8, 23, 30 and 50 atm at 1800°, 1900°, 2000°, 2050°, and 2100° C. respectively.

A further improved silicon nitride having a more uniform microstructure, and exhibiting improved room temperature strength characteristics and high temperature long term durability, can be manufactured using a sintering process consisting essentially of an initial firing between 1500° and 1850° C. for more than one but less than twelve hours, an intermediate firing between 1850 and 2000° C. for at least 30 minutes but less than five hours, and a final firing between 2000° and 2045° C. for at least one hour but no more than 5 hours. Such sintering process creates a particularly uniform microstructure through modifying the nucleation and growth kinetics of the whisker-like $\beta Si_3N_4$ grains.

Preferably, the grain boundary phase in the product of this invention is substantially crystalline. However, even if the grain boundary phase is primarily amorphous initially, the material can still exhibit excellent stress-rupture and intermediate temperature oxidation resistance due to the rapid crystallization of the amorphous phase at high temperatures during the testing. After the crystallization, the grain boundary phases in the product of this invention are mixtures of H, K, J, and other minor phases with the H phase being the primary phase when La is the Ln element and the La/Y molar ratio is higher than ~0.2. Preferably, the H phase constitutes greater than 50% of the grain boundary phases in the product of this invention having the formula of $Sr_x(Y_yLn_{1-y})_{10-x}(SiO_4)_6N_{2-x}O_x$, wherein x ranges from about 0.5–2 and y is 0.6–1. Most preferably, x ranges from about 1.3 to 1.8, and y ranges from about 0.65 to 0.95.

If the silicon nitride fabricated using the conditions described hereinabove is cooled relatively fast from the sintering temperature so that the liquid phase form glass between the $Si_3N_4$ grains, its microstructure and grain boundary phase property is sufficient to yield a ceramic body with chevron-notch fracture toughness greater than 7.5 $MPa \cdot m^{0.5}$ and damage resistance properties. However, if the silicon nitride is slow-cooled or heat-treated after the sintering so that it contains primarily crystalline grain boundary phases, damage resistance properties of said silicon nitride ceramic are found, unexpectedly, to depend strongly on the temperature at which the major crystallization event takes place. If this event takes place either during cooling or in a reheating process at 1375° C. or lower temperatures, the grain boundary property changes which results in significant reduction of damage resistance. On the other hand, if the major crystallization process takes place at temperatures above 1375° C., more preferably above 1450° C. the damage resistance property remains about the same as that of the silicon nitride ceramic without the crystallization heat treatment. Moreover, we have unexpectedly found that for silicon nitride ceramics which have lost some of their damage resistance as a result of grain boundary phase crystallization at 1375° C. or lower temperatures, an annealing process at temperature greater than 1375° C. can restore the material's fracture toughness.

The following is a brief description of a general procedure for manufacturing the final silicon nitride ceramic of the present invention:

First, a homogeneous mixture of powders is formed by known methods. The mixture is prepared by blending and milling powders of silicon nitride, $Y_2O_3$, $Ln_2O_3$, $SrCO_3$ which later converts to SrO, and SrC. The powder mixture is then formed into the desired shape by slip casting, cold isostatic pressing, die forming, or other conventional ceramic manufacturing techniques.

The green ceramic body is then first fired in the temperature range of 1500° C. to 2045° C., wherein (a) an initial sintering is carried out at temperatures between 1500° and 1850° C. and preferably between 1650° and 1850° C., for a time greater than one but less than twelve hours, and preferably greater than 2 but less than 6 hours; (b) an intermediate sintering is carried out at temperatures between 1850° and 2000° C. and preferably between 1900° and 1975° C. for at least 30 minutes but less than five hours, and preferably for at least 60 minutes but less than 3 hours; (c) a final sintering is carried out at temperatures ranging from about 2000° to 2045° C. and preferably from about 2010° to 2035° C. and for a time ranging from about one to five hours and preferably from about 1 to 3 hours; (d) each of the steps being carried out under nitrogen pressure sufficiently high to avoid decomposition of silicon nitride, and the temperature of he succeeding steps being at least 25° C. greater than that of the first of the steps.

After the completion of the sintering and grain growth process, the silicon nitride is cooled relatively fast so that the majority of the grain boundary phase remains amorphous, and then reheated to a temperature above 1375° C. for crystallization. It can also be cooled down from the sintering temperature in a controlled way so that at least 90% of the grain boundary phase crystallizes at temperature above 1375° C., and more preferably above 1450° C. The grain boundary phase can also be crystallized at temperature below 1375° C. first, and then annealed at temperature above 1375° C., and more preferably at temperature above 1450° C.

The following examples are presented to provide a more complete understanding of the invention. The specific technique, conditions, materials, proportions and reported data set forth to illustrate the principles and practice of the invention are exemplary and should not be construed as limiting the scope of the invention.

EXAMPLE

Commercial $Si_3N_4$ powders (TS-10 and UBE E-10) were used in the preparation of the samples shown in this example. The powders had high alpha contents of ~96%, less than 100 ppm of metallic impurities such as Fe, Al, Ca, Na, or K, and 1 to 2 wt % of oxygen. Their average particle sizes were~0.6 μm, and the specific surface areas were ~10-$m^2$/g. The $Y_2O_3$ powders used had purity levels of more than 99 wt % and had average particle size less than 5 μm. The SiC powders added were of the type having an average particle size of ~0.5 m. Strontium carbonate (99% pure, ~1 μl average size) was used as the precursor for SrO: one hundred parts by weight strontium carbonate yield 70 parts by weight SrO.

Either cold isostatic pressing (CIP) or slip casting was used to prepare the green bodies of the compositions shown in Table 1. For CIP, the formulated mixture weighing 350 g was wet-milled for 24 hours in a one liter high density polyethylene bottle with 500 mL isopropanol and with 2 kg silicon nitride grinding media. The milled slurry was vacuum dried, and the resulting powder sieved through a 60 mesh nylon screen. The sieved powder was isostatically pressed at a pressure 200–300 MPa to obtain green compacts of approximately 25mm by 25 mmby 60 mm. For slip casting, the formulated mixtures weighing 1000 g per batch were wet-milled for 6 hours with water and the $Si_3N_4$ grinding media. The water's PH level was adjusted to 9.8 by adding $NH_4OH$, and a dispersant (Darvan C) in an amount of 0.3 wt % was added into the water. After the milling, the slurry was pressure slip-cast under 40 psi gas pressure into billets of ~2.61"×2.6"×1", and dried in a humidity chamber.

The samples were sintered in a graphite resistance furnace under elevated nitrogen gas pressure using the firing conditions shown in Tables 1. The nitrogen pressure used is sufficient to suppress the decomposition of the $Si_3N_4$. The minimum nitrogen pressure required was 10 psi at 1600 C, 50 psi at 1800 C, 150 psi at 1950 C, 300 psi at 2000 C, and 500 psi at 2050 C. All the samples listed in Table 1 densified to >98% of the theoretical densities. After sintering, they were heat-treated at temperatures between 1400 and 1550 C in nitrogen for 5 to 10 hours to crystalize the grain boundary phase.

The stress-rupture properties of the samples were tested under 4-point bend stress, and their lifetimes are shown in Table 1. The specimen used was 3 mm by 4 mm by 50 mm, and the silicon carbide jig used has a 20 mm inner span and a 40 mm outer span. The testing was conducted at 1370° C. (2500° F.) under a 380 MPa (55 ksi) stress. The lifetime shown in Table 1 for each sample is the maximum time that the specimens can survive the testing. If a specimen survived 100 hours of loading, the testing was terminated.

Sample Nos. 1–10 all have Ln/Y molar ratios greater than 1, and their stress-rupture lifetimes are less than 100 hours under a 380 MPa 4-point bend stress at 1370 C. In fact, only one sample (No. 6) has a lifetime greater than 10 hours. Sample Nos. 11–14 do not have $Y_2O_3$ as a sintering aid, and one can see that their stress-rupture lifetimes are less than 1 hour.

Sample Nos. 15–30 all have $Y_2O_3$ in the amounts between 2 to 10 wt %, $Ln_2O_3$ in the amounts so that the molar ratios of Ln to Y are equal to or smaller than 1, SrO in the amounts so that the molar ratios of Sr to the sum of Y and Ln are between 0.1 and 0.5, and SiC in the mounts between 0.2 and 5 wt % of the total. As we can see, most of their stress-rupture lifetimes are greater than 100 hours under 380 MPa at 1370 C in air. Notice that sample No. 15 having L/Y=1 has a lifetime >100 hour, but sample No. 16 having Ln/Y=0.83 has a lifetime of 10 hours. These results indicate that when the Ln/Y molar ratio is reduced to smaller than about 1 the stress-rupture lifetimes of the $Si_3N_4$ samples become greater than 100 hours.

Sample Nos. 20 arid 25 were further subjected to tensile stress-rupture and creep testing. The specimen used is the flat dog-bone type having a 14 mm long gage section and a 2.5 mm×2.5 mm cross section. It was connected to a silicon carbide rod using silicon nitride pins in a furnace, and a pre-determined load was applied as the furnace reached the set temperature. The deformation of the gage section is monitored by measuring the distance between two silicon nitride markers attached to the gage section of the specimen using a scanning laser light.

FIG. 1 shows the result for sample No. 20 tested at 1300° C. under a 250 MPa tensile stress. The sample does not fracture after 250 hours, and the steady-state creep rate is below ~$1\times10^{-9}$ $s^{-1}$. FIG. 2 shows the tensile creep testing results at 1370 C for sample No 20 under a 175 MPa stress and for sample No. 25 under a 150 MPa stress. Both samples lasted for more than 300 hours without fracture with steady state creep rates of $2\times10^{-9}$ $s^{-1}$. These results show that the product of this invention is significantly improved in the long-term high temperature performance over other sintered silicon nitride ceramics. As a comparison, the lifetime of a commercial $Si_3N_4$ ceramic having 6 wt % $Y_2O_3$ additive and a 4-point bend strength of about 600 MPa at 1370° C. is less than 10 hours under 100 MPa tensile stress at 1370 C with a tensile creep rate of $10^{-7}$ $s^{-1}$ (J. Am. Ceram Soc. v. 75, p. 2453–62, 1992). Another example is a commercial $Si_3N_4$ ceramic having 4 wt % $Y_2O_3$ sintering aid and a 1370° C. bend strength of ~600 MPa has a lifetime of 10–100 hours at 1370 ° C. under 150 MPa tensile stress (Ceram. Sci. Proc., v.12, p. 1862–72, 1991).

X-ray diffraction reveals that the major grain boundary phases in the samples shown in Table 1 are the H, K and J phases. The most common one is the H phase which can constitute up to >90% of the total of the grain boundary phases. The oxidation weight gain after 100 hours at 1000° C. in air was found to be closely related to the Sr/(Y+Ln) molar ratio, and an increase in the ratio improves the 1000° C. oxidation resistance. When the Sr/(Y+Ln) molar ratio drops to below about 0.1, the oxidation weight gain becomes greater than~0.5 mg/$cm_2$. When the Sr/(Y+Ln) ratio becomes greater than~0.17, the 1000 C/100 hours oxidation weight gain becomes less than 0.1 mg/$cm^2$. Furthermore, the post-oxidation strength retains >~90% of their initial strength.

TABLE 1

| Sample No. | Composition (wt %) | | | | Ln/y Molar Ratio | Sr/(Ln + Y) Molar Ratio | Firing Conditions Temp. (°C.)/Time (h)/ Pressure (atm) | Lifetime at 1370° C./380 MPa |
| --- | --- | --- | --- | --- | --- | --- | --- | --- |
| 1*  | 2.0 Y$_2$O$_3$ | 6.0 La$_2$O$_3$ | 2.0 SrO | 1.0 SiC | 2.08 | 0.35 | 1975/3 + 2010/3 | 0.1 h |
| 2   | 2.0 Y$_2$O$_3$ | 9.0 Yb$_2$O$_3$ | 1.5 SrO | 0.5 SiC | 2.58 | 0.23 | 1800/2 + 1950/3 + 2000/2 | 0.05 h |
| 3   | 2.0 Y$_2$O$_3$ | 7.0 Yb$_2$O$_3$ | 1.2 SrO | 1.0 SiC | 2.0 | 0.22 | 1800/2 + 1950/3 + 2000/2 | 0.2 h |
| 4*  | 1.5 Y$_2$O$_3$ | 4.5 La$_2$O$_3$ | 2.0 SrO | 1.5 SiC | 2.08 | 0.47 | 1975/3 + 2020/3 | 0.08 h |
| 5   | 1.7 Y$_2$O$_3$ | 5.1 La$_2$O$_3$ | 1.2 SrO | 0.6 SiC | 2.08 | 0.25 | 1800/2 + 1950/3 + 2000/2 | 0.8 h |
| 6   | 1.8 Y$_2$O$_3$ | 5.4 La$_2$O$_3$ | 0.8 SrO | 1.5 SiC | 2.08 | 0.16 | 1650/2 + 1950/3 + 2020/3 | 14 h |
| 7*  | 1.9 Y$_2$O$_3$ | 5.7 La$_2$O$_3$ | 0.4 SrO | 1.5 SiC | 2.08 | 0.07 | 1975/3 + 2025/3 | 0.002 h |
| 8   | 1.7 Y$_2$O$_3$ | 4.9 La$_2$O$_3$ | 1.4 SrO | 1.5 SiC | 2.0 | 0.30 | 1850/2 + 1950/2.5 + 2020/2 | 0.1 h |
| 9*  | 2.7 Y$_2$O$_3$ | 3.9 La$_2$O$_3$ | 1.4 SrO | 1.5 SiC | 1.0 | 0.28 | 1975/3 + 2025/3 | 0.05 h |
| 10  | 3.1 Y$_2$O$_3$ | 5.4 Yb$_2$O$_3$ | 1.5 SrO | 0.5 SiC | 1.0 | 0.26 | 1800/2 + 1950/3 + 2025/2 | 0.03 h |
| 11  | 6.0 Pr$_2$O$_3$ | 4.0 Yb$_2$O$_3$ | 1.5 SrO | 0.8 SiC | — | — | 1800/2 + 1950/3 + 2000/1.8 | 0.007 h |
| 12* | 5.5 Yb$_2$O$_3$ | 5.5 Dy$_2$O$_3$ | 1.0 SrO | 1.0 SiC | — | — | 1975/3 + 2020/3 | 0.05 h |
| 13  | 4.8 Pr$_2$O$_3$ | 3.2 Yb$_2$O$_3$ | 1.2 SrO | 0.8 SiC | — | — | 1800/2 + 1950/3 + 2000/1.8 | 0.05 h |
| 14  | 6.0 Pr$_2$O$_3$ | 6.0 La$_2$O$_3$ | 1.0 SrO | 1.0 SiC | — | — | 1800/2 + 1950/3 + 2000/1.8 | 0.02 h |
| 15  | 4.8 Y$_2$O$_3$ | 7.0 Yb$_2$O$_3$ | 1.2 SrO | 0.5 SiC | 1.0 | 0.15 | 1750/2 + 1925/3 + 2000/1.8 | >100 h |
| 16  | 4.7 Y$_2$O$_3$ | 6.8 Yb$_2$O$_3$ | 1.5 SrO | 0.8 SiC | 0.83 | 0.19 | 1800/2 + 1950/2.5 + 2000/1.5 | 10 h |
| 17  | 5.7 Y$_2$O$_3$ | 7.8 Yb$_2$O$_3$ | 1.5 SrO | 2.0 SiC | 0.78 | 0.16 | 1750/4 + 1925/3 + 2000/2 | >100 h |
| 18  | 8.2 Y$_2$O$_3$ | 7.8 La$_2$O$_3$ | 2.0 SrO | 2.0 SiC | 0.66 | 0.16 | 1750/3 + 1925/3 + 2020/2 | >100 h |
| 19  | 6.0 Y$_2$O$_3$ | 4.5 La$_2$O$_3$ | 1.5 SrO | 4.0 SiC | 0.52 | 0.18 | 1800/2 + 1950/3 + 2000/2 | >100 h |
| 20  | 4.0 Y$_2$O$_3$ | 3.0 La$_2$O$_3$ | 1.0 SrO | 0.6 SiC | 0.52 | 0.18 | 1700/10 + 1950/3 + 2000/2 | >100 h |
| 21  | 4.0 Y$_2$O$_3$ | 2.8 La$_2$O$_3$ | 1.2 SrO | 0.5 SiC | 0.49 | 0.22 | 1800/2 + 1950/3 + 2000/2 | >100 h |
| 22  | 4.3 Y$_2$O$_3$ | 2.5 La$_2$O$_3$ | 1.2 SrO | 0.6 SiC | 0.40 | 0.22 | 1800/2 + 1950/3 + 2020/2 | >100 h |
| 23  | 7.0 Y$_2$O$_3$ | 4.8 Yb$_2$O$_3$ | 1.2 SrO | 0.6 SiC | 0.39 | 0.13 | 1750/1 + 1925/3 + 2000/2 | >100 h |
| 24  | 4.6 Y$_2$O$_3$ | 2.2 La$_2$O$_3$ | 1.2 SrO | 0.6 SiC | 0.33 | 0.21 | 1800/2 + 1950/3 + 2020/2 | >100 h |
| 25  | 5.0 Y$_2$O$_3$ | 2.0 La$_2$O$_3$ | 1.0 SrO | 0.6 SiC | 0.28 | 0.17 | 1800/2 + 1950/3 + 2020/2 | >100 h |
| 26  | 7.0 Y$_2$O$_3$ | 2.8 Yb$_2$O$_3$ | 1.2 SrO | 0.6 SiC | 0.23 | 0.15 | 1800/2 + 1950/3 + 2020/2 | >100 h |
| 27  | 5.6 Y$_2$O$_3$ | 2.2 Yb$_2$O$_3$ | 1.0 SrO | 0.6 SiC | 0.23 | 0.16 | 1850/2 + 1950/4 + 2025/2.5 | >100 h |
| 28  | 5.4 Y$_2$O$_3$ | 1.6 La$_2$O$_3$ | 1.0 SrO | 0.6 SiC | 0.21 | 0.17 | 1800/2 + 1950/3 + 2020/2 | >100 h |
| 29  | 5.1 Y$_2$O$_3$ | 1.5 La$_2$O$_3$ | 1.0 SrO | 0.6 SiC | 0.20 | 0.18 | 1800/2 + 1950/3 + 2020/2 | >100 h |
| 30  | 6.0 Y$_2$O$_3$ | 1.0 La$_2$O$_3$ | 1.0 SrO | 0.6 SiC | 0.12 | 0.16 | 1800/2 + 1950/3 + 2020/2 | >100 h |

*Prepared by CIP

What is claimed is:

1. A silicon nitride sintered body having a composition consisting essentially of
   (a) about 75% to 96 wt % silicon nitride;
   (b) about 2–10 wt % yttrium oxide;
   (c) at least one oxide of Lanthanide (Ln) present in an amount wherein the molar ratio of Ln to Y is smaller than 1;
   (d) strontium oxide present in an amount wherein the molar ratio of Sr to the sum of Y and Ln is between 0.1–0.5; and
   (e) about 0.2 to 5 wt % of silicon carbide.

2. A silicon nitride sintered body as recited by claim 1, wherein the molar ratio of Sr to the sum of Y and Ln is between 0.17 and 0.25.

3. A silicon nitride sintered body as recited by claim 1, wherein the said lanthanide element is one of La and Yb.

4. A silicon nitride sintered body as recited by claim 2, wherein the molar ratio of Ln to Y is between 0.1 and 0.6.

5. A silicon nitride sintered body as recited by claim 1, wherein greater than 90% of the grain boundary phases in said silicon nitride is crystalline.

6. A silicon nitride sintered body as recited in claim 5, wherein greater than 50% of said crystalline grain boundary phases is the H phase of apatite structure.

7. A silicon nitride sintered body as recited in claim 6, wherein the said H phase has the formula of $Sr_x(Y_yLn_{1-y})_{10-x}(SiO_4)_6N_{2-x}O_x$, wherein x is between 0.5–2 and y is between 0.6–1.

8. A silicon nitride sintered body having a composition consisting essentially of
   (a) about 85 to 96 wt % of silicon nitride;
   (b) about 3–7 wt % yttrium oxide;
   (c) at least one oxide of Lanthanide (Ln) present in an amount wherein the molar ratio of Ln to Y is smaller than 1;
   (d) strontium oxide present in an amount wherein the molar ratio of Sr to the sum of Y and Ln is between 0.17–0.25; and
   (e) about 0.2 to 5 wt % of silicon carbide.

9. A silicon nitride sintered body as recited by claim 8, wherein the molar ratio of Ln to Y is between 0.1 and 0.6.

10. A silicon nitride sintered body as recited by claim 1, said body having been sintered by a process consisting of firing in the temperature range of 1500° C. to 2045° C., wherein:
    (a) an initial sintering is carried out at a temperature between 1500 and 1850° C. and for a time greater than one but less than twelve hours;
    (b) an intermediate sintering is carried out at a temperature between 1850° and 2000° C. for at least 30 minutes but less than five hours;
    (c) a final sintering is carried out at a temperature ranging from about 2000 to 2045° C. for a time ranging from about one to five hours;
    (d) each of said steps being carried out under nitrogen pressure sufficiently high to avoid decomposition of silicon nitride, and the temperature of said succeeding steps being at least 25° C. greater than that of said first of said steps.

* * * * *